United States Patent [19]
Simpson, Jr.

[11] 3,858,111
[45] Dec. 31, 1974

[54] METHOD AND APPARATUS FOR SENSING CHEMICAL PROCESS CONCENTRATIONS
[75] Inventor: James H. Simpson, Jr., Katonah, N.Y.
[73] Assignee: The Singer Company, New York, N.Y.
[22] Filed: Aug. 14, 1972
[21] Appl. No.: 280,275

Related U.S. Application Data
[63] Continuation of Ser. No. 85,957, Nov. 2, 1970, abandoned.

[52] U.S. Cl. ............................................. 324/.5 R
[51] Int. Cl. ......................................... G01n 27/78
[58] Field of Search .............. 324/.5 R, .5 A, .5 AC, 324/.5 AH, .5 H

[56] References Cited
UNITED STATES PATENTS

| | | | |
|---|---|---|---|
| 2,912,641 | 11/1959 | Ruble | 324/.5 |
| 2,922,947 | 1/1960 | Bloom | 324/.5 |
| 3,153,756 | 10/1964 | Williams | 324/.5 |
| 3,502,964 | 3/1970 | Freeman | 324/.5 |
| 3,531,715 | 9/1970 | Watson | 324/.5 |
| 3,639,738 | 2/1972 | Lankien | 324/.5 |

OTHER PUBLICATIONS
Radio–Frequency Spectroscopy, V. 1, No. 3–pub. by Varian Assoc.–1955–pp. 1–4.

Primary Examiner—Michael J. Lynch
Attorney, Agent, or Firm—S. A. Giarratana

[57] ABSTRACT

The concentration of aluminum in Bayer Process liquors is determined by subjecting a sample of the liquor and two, aluminum compound-containing reference samples of known aluminum concentrate to the same nuclear magnetic resonance scanning field so that an output signal representing the derivative of the dispersion component of the induced nuclear magnetic resonance signal is produced. When the aluminum compounds in the reference samples are selected to have resonance points on both sides of the resonance point of the liquor sample, the output signal has components representing the concentration of aluminum in each of the three samples so that absolute aluminum concentration of the liquor sample can be determined by comparing the three signal components and the apparatus can be self-calibrated by comparing the components representing the aluminum concentrations in the reference samples. The ratio of aluminum concentration to sodium concentration in the liquor sample is determined by applying a step function to the scanning field, so that the field is swept through the resonance point for the sodium and the output signal has a component representing sodium concentration.

2 Claims, 3 Drawing Figures

METHOD AND APPARATUS FOR SENSING CHEMICAL PROCESS CONCENTRATIONS

This is a continuation, of now abandoned application Ser. No. 85,957, filed Nov. 2, 1970.

BACKGROUND OF THE INVENTION

1. Field of the Invention

This invention relates generally to a method and apparatus for sensing chemical process concentrations of substances and more particularly to a method and apparatus for sensing both the absolute concentration of aluminum and the relative concentrations of aluminum and sodium in the liquors associated with the Bayer Process for the recovery of aluminum from Bauxite.

2. Description of the Prior Art

In the Bayer Process for the recovery of aluminum from Bauxite ore, a so-called "green" liquor, which is a solution of Bauxite digested in hot caustic, is treated to cause precipitation of the aluminum as a hydroxide. After the aluminum has been precipitated from the green liquor, the liquor is referred to as the "spent" liquor. In order to efficiently and economically carry out the Bayer Process, it is important to measure the concentration of the aluminum ion in both the green and spent liquors. It is also important to measure the ratio of the concentration of aluminum to the concentration of the sodium introduced as the caustic in the green liquor. Since the Bayer Process is usually carried out on a continuous or production basis, it is quite important that the measuring techniques employed lend themselves to continuous or "on-line" monitoring use.

Many of the older methods for measuring the concentration of aluminum and sodium in the liquors of the Bayer Process consisted of wet chemical titrations which were carried out manually during the course of the process. Obviously, methods of this type were very time consuming and consequently did not yield the required information as quickly as desired. Additionally, some laboratory work has been carried out for the measurement of chemical substance concentrations by the use of so-called "nuclear magnetic resonance" or "NMR" techniques. With these techniques, unknown solutions of substances having a definite magnetic moment are subjected to NMR magnetic sweep fields and a sensing coil is employed to pick up NMR output signals which have an amplitude proportional to the concentration of the nuclei of the substance being measured. A measurement system of this type can, of course, only be employed for the sensing of nuclei having a gyromagnetic moment, since the nuclei must be capable of magnetic procession when they are subjected to the magnetic sweep field. Since the relationship between the magnetic field strength applied to the nuclei and the resonance frequency is unique for each nucleus having a magnetic moment, the concentration of a particular nucleus in a solution can be ascertained by measuring the amplitude of the NMR signal induced in the NMR sensing coil. The application of NMR measuring techniques to chemical processes, such as the Bayer Process, for example, has been difficult because of the existence of temperature and electronic drift factors which reduce the operating accuracy of the measuring equipment over long periods of time and which, consequently, render such laboratory equipment unsuitable for use in the environment of day-to-day plant operations.

SUMMARY OF THE INVENTION

It is an object of this invention to provide a method and apparatus for the measurement of absolute and relative concentrations of chemical substances in processes wherein the nuclei of the substances being measured have defined magnetic moments.

It is a further object of this invention to provide a method and apparatus for the measurement of the absolute concentration of aluminum and the relative concentration of aluminum to sodium in the liquors of the Bayer Process, which method and apparatus are capable of a high order of operating accuracy over long periods of time.

It is a still further object of this invention to provide a method and apparatus for the measurement of concentrations of aluminum and sodium in the liquors of the Bayer Process, which method and apparatus are essentially self-calibrating in nature and which readily lend themselves to on-line monitoring use.

Briefly, the present invention contemplates the application of NMR measuring techniques to sense the concentration of a substance in an unknown solution of the type wherein the nucleus of the substance has a defined magnetic moment. The term "solutions" as used herein shall be deemed to include both mixtures and solutions in the true chemical sense. A three compartment sample cell is utilized to hold the unknown solution and two different reference solutions. Each of the reference solutions has a known concentration of the substance being measured and has an NMR resonance point lying on opposite sides of the resonance point of the unknown solution, so that when all three solutions are subjected to the same NMR magnetic sweep field produced by NMR scanning means an NMR output signal is produced having components representing the concentration of the substance in each of the solutions. The components of the NMR output signal are compared in comparison circuit means to provide an output signal representing the absolute concentration of the substance in the unknown solution. The components of the NMR output signal representing the known concentrations of the reference solutions may be compared to provide a test signal for self-calibration of the measuring equipment. A step function may be applied to the NMR magnetic sweep field to cause the NMR output signal to have components representing the concentration of another substance in the unknown solution.

The nature of the invention and other objects and additional advantages thereof will be more readily understood by those skilled in the art after consideration of the following detailed description taken in conjunction with the accompanying drawings.

DESCRIPTION OF THE PREFERRED EMBODIMENT OF THE INVENTION

Figure 1:
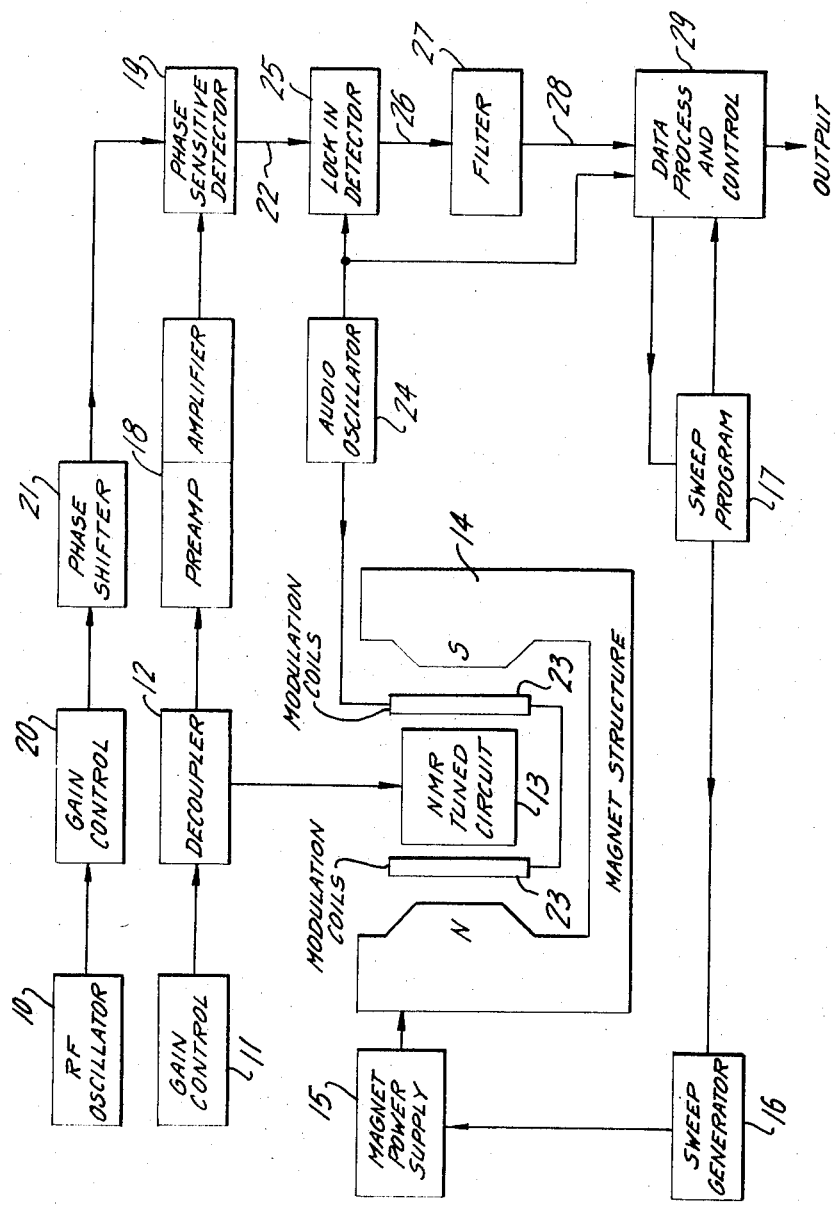
FIG. 1 is a schematic diagram of apparatus constructed in accordance with the teachings of the present invention for measuring the concentration of aluminum and sodium in the liquors of the Bayer Process.

Referring now to FIG. 1 of the drawings, there is shown NMR apparatus constructed in accordance with the teachings of the present invention for the measurement of the concentration of aluminum and sodium nuclei in the liquors of the Bayer Process. In general, NMR apparatus of the type shown in FIG. 1 of the drawings is capable of subjecting a sample containing an unknown concentration of a particular nucleus to a magnetic field which is composed of a relatively large dc component $H_0$ directed along one axis of a tri-axis reference system and an oscillatory component $H_1$ in the plane formed by the two remaining reference axes. The oscillatory component $H_1$ is usually broken down into in phase and quadrature components which are viewed from a coordinate system rotating about the direction of the $H_0$ field at the frequency of oscillation of the $H_1$ field. In this coordinate system, the two components of the magnetization will be time independent. The in phase and quadrature components may be represented by the symbols "$u$" and "$v$." The $u$ component is customarily referred to as the dispersion component and the $v$ component is customarily referred to as the absorption component of the induced NMR signal. Basic NMR phenomena and mathematical derivations of the form of the magnetic sweep field components are treated in many known reference texts and publications and will not be described further herein.

As seen in FIG. 1, a radio frequency oscillator 10 is coupled through a gain control circuit 11 and a decoupler circuit 12 to the sensing coil of an NMR tuned circuit 13. The RF oscillator 10 is arranged to supply the sensing coil of the tuned circuit 13 with signals having a frequency which causes the particular nuclei being sensed to resonate at the magnetic field strength employed in the apparatus. For nuclei having a gyromagnetic moment and which are therefore capable of being resonated, the relationship between magnetic field strength and frequency is unique, so that a given nucleus can be sensed separately from other nuclei in a solution by applying a magnetic field and frequency having the prescribed relationship. Since the field strength to be applied to a particular nucleus is dependent upon the frequency employed, the NMR frequency is determined and the field strength is then calculated. For example, when the aluminum nucleus is to be sensed, a field strength of 10 kilogauss would be required for a NMR frequency of 11.094. In practice, the NMR tuned circuit 13 may be a shunt-tuned tank circuit which includes the sensing coil of the unknown sample cell as a component thereof.

Figure 2:
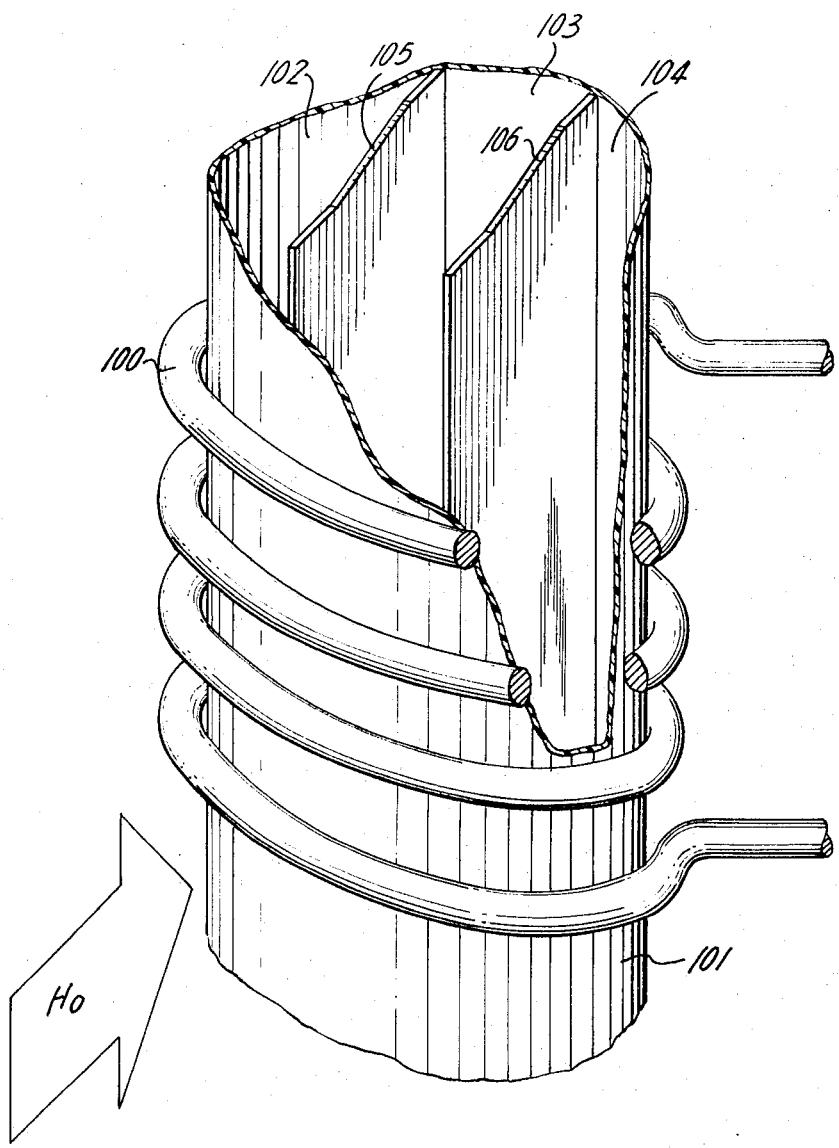
FIG. 2 is a perspective view of the NMR sample cell of FIG. 1 of the drawings with a section of the sample tube partially broken away to reveal details of construction.

The physical construction of a NMR sample cell constructed in accordance with the teachings of the present invention is shown in FIG. 2 of the drawings as comprising a sensing coil 100 and a sample tube 101. The tube 101 is disposed within the coil 100 and is divided into separate compartments or sections 102, 103 and 104 by a pair of dividing walls 105 and 106 which extend along the length of the tube. By virtue of this arrangement, three separate compartments are joined in the sample cell. For reasons which will be described hereinafter, the sections 102 and 104 of the tube are caused to contain two reference samples, while the middle section 103 may be filled with the unknown sample to be measured. The tube 101 is preferably formed of a nn-conductive, non-magnetic material, such as plastic or glass, for example, so that the magnetic field applied by the coil 100 to the sample solutions within the tube is not affected by the material utilized. It is also important that the material of the tube not react chemically with the solutions forming the reference and unknown samples. In practice, the center section 103 of the tube may be connected to a sample or "bleeder" line in the processing equipment so that samples of the Bayer Process liquors being measured flow through the center section directly from the production equipment. The sensing coil 100 of the sample cell is arranged in the $H_0$ magnetic field as illustrated with its axis perpendicular to the direction of the field so that the dividing members 105 and 106 are parallel to the direction of the field. Although the use of a single, sectioned tube, as illustrated, would provide a large filling factor for the coil, it is possible to utilize three separate parallel tubes of circular cross section to form the required sample compartments.

Referring again to FIG. 1 of the drawings, it is seen that the dc field component $H_0$ of the NMR magnetic sweep field is applied to the sensing coil 100 of the sample cell by means of a magnet structure 14 which is energized by a magnet power supply 15 of any suitable type. The magnet power supply 15 is driven by a sweep generator 16 which is in turn controlled by a sweep program circuit 17 for reasons which will be hereinafter described. The sweep generator 16 and sweep program circuit 17 cause the magnet power supply 15 to energize the windings (not shown) of the magnet structure 14 in such a manner that the $H_0$ field is caused to pass or "sweep" through a range of field strengths which encompass the particular field strengths at which the unknown and reference samples will resonate. The magnet structure and power supply should be capable of producing a homogeneous magnetic field over the entire sample region, so that the contribution of the magnet to the resonance line width is minimized. For example, when the aluminum ion concentration is to be measured in the described Bayer Proess, the magnetic field strength would be of the order of 10 kilogauss and consequently the magnet homogeneity factor should be no more than approximately 0.1 gauss.

As thus far described, it is believed apparent that the RF oscillator 10 and the magnet structure 14 combine to provide the dc and oscillatory magnetic field components to the unknown and reference solutions being measured. As the sweep generator 16 causes the $H_0$ field to sweep through the particular magnetic field strength at which the aluminum nuclei in the Bayer Process liquor resonates, a NMR signal is induced in the coil 100 of the sample cell containing the unknown and reference solutions. This induced NMR signal passes through the decoupler circuit 12 to a preamplifier-amplifier combination 18 where it is amplified and applied to a phase sensitive detector 19. The phase sensitive detector 19 is also provided with a reference input which is derived from RF oscillator 10 through a gain control circuit 20 and a phase shifter 21, so that the output 22 of the detector represents the difference in phase between the reference signal from the oscillator 10 and the NMR signal induced in the coil 100 of the tuned circuit 13. The decoupler circuit 12 functions to connect the RF signal from the oscillator 10 to the coil 100 and to prevent the same signal from being applied to the input of the amplifier 18 so that the amplifier is not driven to saturation by the much larger signal from the oscillator. In practice, the decoupler circuit 12 may comprise any one of a number of suitable known arrangements, such as the crossed-coil type, the bridge circuit type or the coaxial hybrid tee type, for example. In all of these arrangements, the lower magnitude, induced NMR signal is effectively separated from the high magnitude RF signal from the oscillator 10. Since the output 22 of the phase sensitive detector 19 represents the difference in phase of the reference signal from the oscillator 10 and the NMR induced signal in the coil 100 of the sample cell, the phase shifter circuit 21 may be employed to vary the phase of the signal from the RF oscillator to the detector signal so that the $u$ or dispersion component of the induced NMR signal is represented by the output of the detector 19. It will be understood, of course, that, if desired, the phase difference between the reference signal from the oscillator 10 and the NMR induced signal in the coil 100 may be adjusted to provide the $v$ or absorption component of the NMR signal or a combination of both the $u$ and $v$ components. In practice, however, the dispersion component is preferred for the measurement of aluminum concentration in the Bayer Process liquors.

In order to provide a signal representing the rate-of-change or derivative of the $u$ component of the NMR signal from the coil 100, a low order, amplitude modulated component is introduced into the magnetic field applied to the unknown and reference samples in the sample cell. To this end, modulation coils 23 are disposed on either side of the NMR sample cell and are arranged to modulate the $H_0$ field at a frequency which is small in comparison to the resonance frequency. An audio oscillator 24 is provided to energize the modulation coils 23 at the required frequency so that the $u$ or disperson component of the NMR signal appearing at the output 22 of phase detector 19 contains components at the modulation frequency. In practice, the modulation frequency applied by the audio oscillator 24 may be of the order of 100 Hz. The output of the audio oscillator is also applied to a lock in detector 25 which is essentially a phase sensitive detector that produces a signal at its output 26 representing the phase difference between the u component of the NMR signal applied at 22 and the reference signal from oscillator 24. The output 26 of the lock in detector is applied to a filter 27 which serves to filter out those components of the output which are close in frequency to dc. Consequently, the filter passes those components of the output of the lock in detector which are at the modulation frequency applied by the audio oscillator 24, so that the output 28 of the filter represents the derivative or rate-of-change of the u component of the NMR signal. It may be noted that the phase sensitive detector 19 and the lock in detector 25 may both comprise conventional phase sensitive detector circuits. These circuits not only perform phase detection functions but also serve as filters to filter out unwanted noise and leakage signals.

Figure 3:
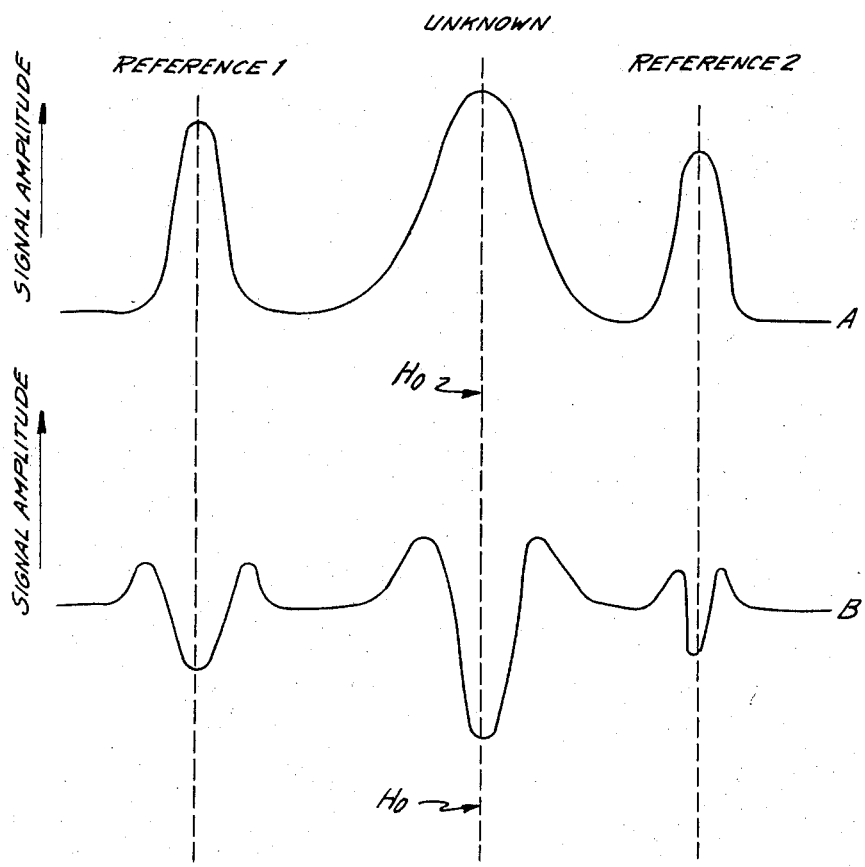
FIG. 3 is a pictorial representation of the waveshapes of the absorption and dispersion components of the induced NMR signals in the apparatus of FIG. 1.

It is believed apparent that the apparatus shown in FIG. 1 of the drawings is capable of producing either the $v$ component or the derivative of the $u$ component or a combination of both components of the NMR signal at the output 28 of the filter 27 depending on the adjustment of the phase shifter circuit 21. The waveshapes of these two components are shown in FIG. 3 of the drawings, wherein curve A is the waveshape of the $v$ or absorption component of the NMR signal and curve B is the waveshape of the derivative of the $u$ or dispersion component of the NMR signal. It will be noted that curve A, which is the $v$ component of the NMR signal, has a decided peak at each of the particular field strengths at which resonance occurs in the three solutions in the sections of the NMR sample cell. Similarly, each of the three solutions in the sample cell produces a component or section of waveshape B having two positive peaks and one negative peak. The two positive peaks of the component of the dispersion derivative curve associated with each of the three solutions define the line width of the resonance peak for that solution and the distance between the positive peaks is proportional to the relaxation time. The amplitude of the negative peak is a function of both the concentration of the nuclei being sensed and the relaxation time. Accordingly, it may be seen that the curve B which represents the derivative of the $u$ component of the NMR signal is preferred over the $v$ component for measurement purposes, since the positive and negative peaks of the derivative signal readily lend themselves to modern data processing techniques. The section 102 of tube 101 of the NMR sample cell is filled with a reference or standard solution containing a known concentration of aluminum ions and the section 104 is filled with another reference or standard solution containing a known concentration of aluminum ions. The aluminum compound in each of the reference samples is so chosen that the NMR resonance of that compound in solution is fairly close to the resonance point of the aluminum in the unknown solution in the middle section 103 of the sample cell. The resonance points of the reference solutions must be spaced sufficiently far from the resonance point of the unknown sample so that the signals produced are clearly defined. Since the position at which resonance occurs for a given nucleus is influenced strongly by the chemical environment of the nucleus in a particular sample, it is possible to choose aluminum compound-containing solutions for each of the reference samples which will produce resonance points on both sides of the resonance point of the unknown sample. This condition is represented in the waveshapes shown in FIG. 3 of the drawings wherein the peaks for each reference sample are disposed on opposite sides of the peaks for the unknown sample. The following table indicates the NMR chemical shifts and line widths for selected representative aluminum compounds at a temperature of 25°C.

| Compound | , ppm | line width, gauss |
| --- | --- | --- |
| $Al(H_2O)_6^{3+}$ ($AlCl_3 \cdot 6H_2O$ in water for which the chemical shift is independent of concentration.) | 0 | 0.05 |
| $Al(OiBu)_3$ (n-heptane solution) | −7 | 0.09 |
| $Al_2I_6$ (ethyl ether solution) | −39 | 0.08 |
| $Al(OH)_4^-$ (aq. basic solution) | −80 | 0.08 |
| $AlCl_3$ (toluene solution) | −91 | 0.3 |
| $Al(iBu)_3$ (pure) | −220 | 5.4 |

In the foregoing table, $\delta$ is the NMR chemical shift and a line width less than 0.1 gauss is considered narrow. It will be understood, of course, that the foregoing table is not comprehensive and that similar tables exist for compounds of elements other than aluminum.

The aqueous basic solution of aluminum shown in the foregoing table is the closest in chemical structure to the aluminum compounds in the Bayer Process liquors and may be used to select the chemical compositions of aluminum compounds for the reference samples. For example, the aluminum chloride in water and the aluminum tri-isobutane solutions would provide a very large chemical shift and could be used as the reference samples in the two sections of the NMR sensing cell. The concentration of aluminum ions in each of the reference solutions is accurately controlled and the aluminum compounds in the solutions are preferably selected to have line widths which are narrow compared to the line width of the unknown solution being measured. By choosing the references to have NMR resonance points on either side of the unknown resonance point, the positions of the resonances serve to monitor the stability of the magnetic field sweep throughout the entire region of interest. By virtue of this arrangement, good equipment and temperature stability for the measuring apparatus is needed only during the period of a single sweep across the three solutions in the NMR sample cell. Consequently, long term error factors such as electronic equipment drift and temperature drift are eliminated.

Referring again to the waveshapes shown in FIG. 3 of the drawings, it is apparent that in order to measure absolute concentration for the sample represented by each of the signals shown therein, it would be necessary to employ the technique of measuring total magnetization independently of relaxation time. This can be done most easily with the curve B which represents the derivative of the dispersion component of the NMR signal, since the line width may be determined from the zero amplitude points and the magnetization from the functional dependence of the maximum amplitude. The form of the signal produced at the output of the lock in detector 25 by a single scan through one of the three solutions in the sample cell may be represented mathematically in the following manner when it is assumed that saturation is negligible and that $\omega m T_2 \ll 1$, where $\omega m$ is the modulation frequency of the audio oscillator 24 and $T_2$ is the transverse relaxation time. The shape of a single signal is given by the expression $$V = \tfrac{1}{8} M_0 H_1 \gamma^2 T_2^2 H_m (1 - \Delta\omega^2 T_2^2)/(1 + \Delta\omega^2 T_2^2)^2, \quad (1)$$

where $V$ is the voltage at the output of the lock in detector, $M_0$ is the net nuclear magnetization established in the dc field $H_0$, $H_1$ is the oscillatory component of the field, $\gamma$ is the gyromagnetic ratio of the nucleus being sensed, $Hm$ is the amplitude of the modulation field, and $\Delta\omega$ is the difference between the resonance frequency and the frequency of the $H_1$ component. If $$f(T_2, \Delta\omega) = (1 - \Delta\omega^2 T_2^2)/(1 + \Delta\omega^2 T_2^2)^2 \quad (2)$$

then the expression for the signal from the three samples may be written as $$\begin{aligned}V =\ & \tfrac{1}{8} M_{01} H_1 \gamma^2 T_{21}^2 H_m f(T_{21}, \Delta\omega_1) + \\ & \tfrac{1}{8} M_{02} H_1 \gamma^2 T_{22}^2 H_m f(T_{22}, \Delta\omega_2) + \\ & \tfrac{1}{8} M_{03} H_1 \gamma^2 T_{23}^2 H_m f(T_{23}, \Delta\omega_3),\end{aligned} \quad (3)$$

where each curve is characterized by a relaxation time $T_2$ and a particular value of field for resonance when $\Delta\omega = 0$. Since the field variation is a linear function of time, the function $f(T_2, \Delta\omega)$ can be related to a function $F(T_2, t)$ at the output of the lock in detector for each of the three sample curves by substituting the expression $$\Delta\omega_1 = a_1 \Delta t_1$$

for the $\Delta\omega_1$ term in Equation 3 and corresponding expressions for the $\Delta\omega_2$ and $\Delta\omega_3$ terms in the same equation. In Equation 4, $\Delta t_1$ is given by the expression $$\Delta t_1 = \gamma(1 + \sigma_1)(t_1 - t) \quad (5)$$

$a_1$ is given by the expression $$a_1 = \gamma(1 + \sigma_1) \quad (6)$$

and $$t_1 = \omega/[\gamma(1 + \sigma_1)h] - H_0/h, \quad (7)$$

where $h$ is the rate-of-change of $H_0$ and $\sigma_1$ is a fraction of the value of the field $H_0$ in the vicinity of resonance for sample 1 at which the shifts are measured. Since the quantities $M_0, \gamma, I_2$ and $\Delta\omega$ are known for both of the reference solutions and the analytical form of the function $f(T_2, \Delta\omega)$ for each reference solution is also known, the parameters $M_0$ and $T_2$ for the unknown solution may be easily extracted from the voltage output curve of the lock in detector and the concentration Nc of the substance in the unknown solution determined from the following expression for the nuclear susceptibility $X_o$ $$X_o = Nc\gamma^2 h^2 I(I+1)/3kT, \quad (8)$$

where $I$ is the angular momentum of the unknown nucleus and $T$ is the temperature.

Referring again to FIG. 1 of the drawings, it is seen that a data process and control circuit 29 is provided to receive the NMR output signal from the lock in detector 25 and the modulation signal from the audio oscillator 24. The circuit 29 also receives an input from the sweep program circuit 17 and provides an output to that circuit. The data process and control circuit 29 may be constructed in accordance with known digital computer techniques to normalize the NMR signal components representing the three solutions in the NMR sample cell to provide a digital output which is independent of relaxation time and which consequently represents the concentration of aluminum ions in each of the solutions. Since the concentration of aluminum in each of the two reference samples is carefully controlled, the digital output signals from the data process and control circuit 29 will accurately indicate the ratio of the concentration of the aluminum ions in the unknown Bayer Process solution to the concentration of aluminum ions in the reference solutions, so that the absolute concentration in the unknown solution can be directly determined. Furthermore, the digital signals representing the concentration of aluminum ions in each of the two reference samples may be compared periodically to provide a test signal for self-calibration of the measuring system of the invention. By virtue of this arrangement, it is believed apparent that errors in measuring system operation arising from long term component and temperature drifts may be eliminated, since the measuring system need be stable only during the period of time in which the sweep is made through the magnetic field strengths of the three solutions in the sample cell. Consequently, a lower degree of sophistication is required for the circuitry of the measuring system of the invention.

It may also be noted that the disclosed system is capable of measuring the ratio of sodium ion concentration to aluminum ion concentration when the NMR scan is extended to include the sodium resonance region. The sodium resonance region for a Bayer Process liquor would probably occur in the vicinity of 13.4 kilogauss and since the sodium and aluminum resonance points are well separated no interference would be encountered during measurements of concentrations of both nuclei. A NMR scan of this type may be easily accomplished by the application of a step function to the sweep signal applied by the sweep generator 16. No additional reference or standard solutions need be employed to make this comparison between the sodium and aluminum concentrations. Although it is possible to continuously monitor a stream of the unknown solution flowing through the center section 103 of the sample cell to provide a continuous indication of aluminum concentration, the sensing of a flowing sample stream will introduce certain errors arising from a change in relaxation times due to the motion of the unknown sample through the sensing coil and the introduction of microphonic noise produced by the moving material. Consequently, it is preferable to stop the flow of material through the center section of the sample cell during the period that measurement is made to thereby eliminate the foregoing errors.

It is believed apparent that many changes could be made in the construction and described uses of the foregoing apparatus and many seemingly different embodiments of the invention could be constructed without departing from the scope thereof. For example, it is believed apparent that the described method and apparatus could be employed to carry out concentration measurements of nuclei having magnetic moments in different types of processes. Accordingly, it is intended that all matter contained in the above description or shown in the accompanying drawings shall be interpreted as illustrative and not in a limiting sense.

What is claimed is:

1. The method of sensing the concentration of aluminum ions in Bayer process liquors comprising the steps of subjecting a sample of the liquors and two reference samples containing known concentrations of aluminum ions but having NMR resonance points lying on opposite sides of the resonance point for the liquor sample to the same NMR magnetic sweep field and the same radio frequency field;

applying a step function to the NMR magnetic sweep field to sense the ratio of aluminum concentration to sodium concentration in said liquor sample;

sensing the components of the resulting NMR output signal which represents the aluminum concentrations in the three samples;

comparing said signal components to derive an output signal representing the absolute concentration of aluminum in said liquor sample; and comparing the said NMR output signal components representing the aluminum concentrations in said reference samples to determine the accuracy of the performance of the method.

2. Apparatus for sensing the concentration of a substance in an unknown solution of the type wherein the nucleus of the substance has a magnetic moment comprising:

a. a three compartment sample cell having said unknown solution in one compartment thereof, said unknown solution being a Bayer process liquor and said substance the aluminum nucleus therein, and different reference solutions in the other compartments thereof, each of said reference solutions containing a different compound of aluminum, with each of said aluminum compounds exhibiting a different NMR chemical shift of its resonance point from the NMR resonance point of said unknown solution with the NMR resonance point of said reference solutions lying on opposite sides of the NMR resonance point of said unknown solution;

b. NMR producing means for subjecting said sample cell to an NMR magnetic sweep field and a radio frequency field produced by a resonance circuit having a coil surrounding said sample cell to produce an NMR signal representing the concentration of said substance in each of said solutions and wherein said NMR producing means applies a step function to said magnetic sweep field so that the magnetic sweep field is swept through the NMR resonance point of the sodium in said Bayer process liquid to produce an NMR output signal having components representing the ratio of aluminum concentration to sodium concentration in said liquor;

c. means to receive said NMR signals to produce an output signal representative of the derivative of the dispersion components of said NMR signal; and d. comparison circuit means coupled to receive said output signal to produce a concentration output signal representing the concentration of said substance in said unknown solution.

* * * * *